Aug. 16, 1960   D. H. PUTNEY   2,949,494
ALKYLATION OF HYDROCARBONS UTILIZING EVAPORATIVE COOLING
Filed Aug. 16, 1954
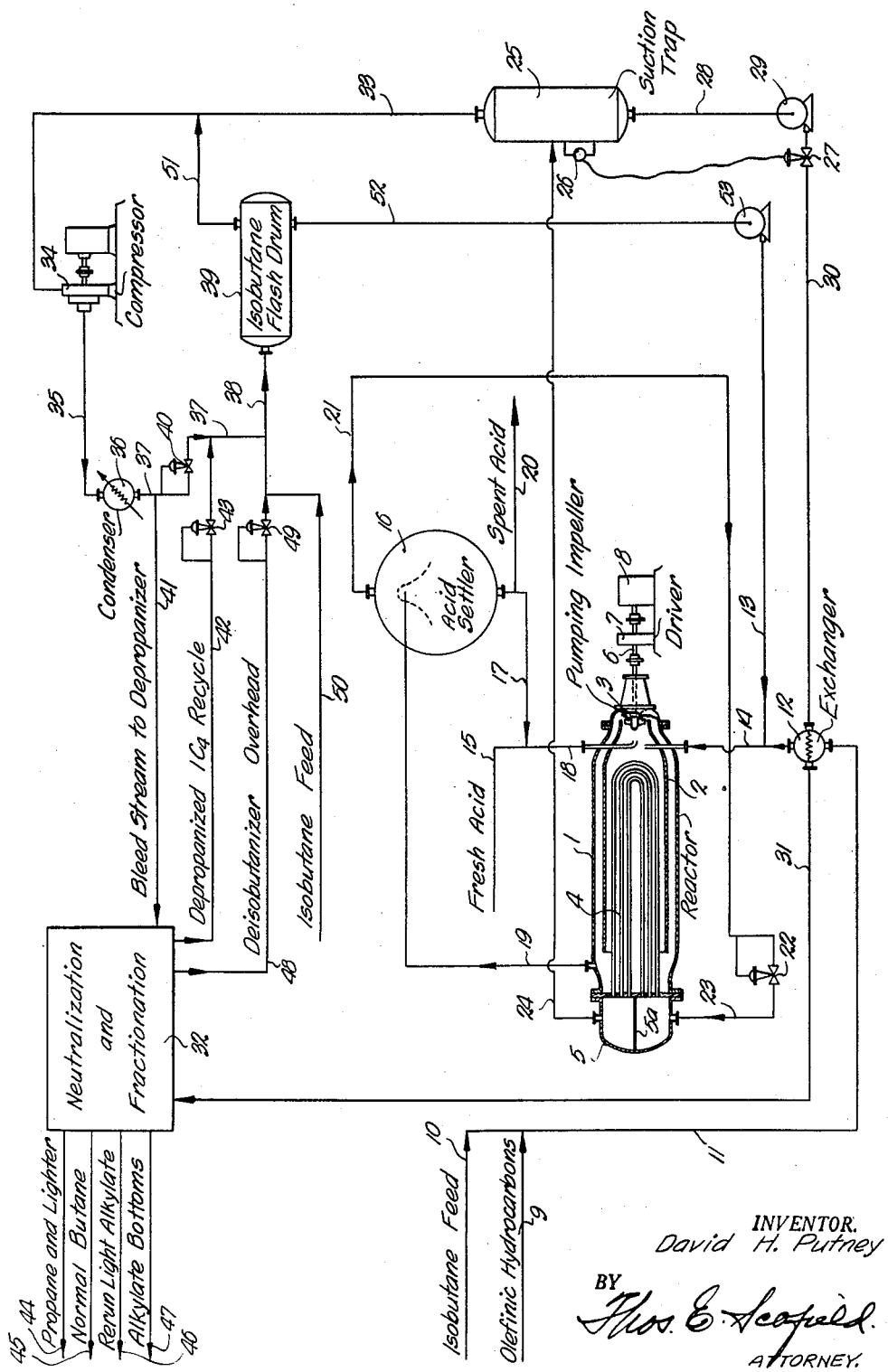
INVENTOR.
David H. Putney
BY
Thos. E. Scofield
ATTORNEY.

United States Patent Office 2,949,494
Patented Aug. 16, 1960

2,949,494

ALKYLATION OF HYDROCARBONS UTILIZING EVAPORATIVE COOLING

David H. Putney, Kansas City, Mo., assignor to Stratford Engineering Corporation, Kansas City, Mo., a corporation of Delaware Filed Aug. 16, 1954, Ser. No. 450,192

7 Claims. (Cl. 260—683.58)

This invention relates to improvements in the alkylation of hydrocarbons and refers more particularly to a process in which evaporative cooling of the hydrocarbons is employed with indirect heat exchange to reduce the temperature of the reactants prior to and during the reaction step. The process is an improvement upon the methods disclosed in Patents No. 2,649,486 and No. 2,664,452, dated December 29, 1953.

The process herein described differs from that of Patents No. 2,649,486 and No. 2,664,452 principally in the location of the vapor-liquid separating zone for the chilled hydrocarbon effluent in relation to the cooling elements of the reaction zone. These patents call for a separation of the liquid and vapor hydrocarbon phases immediately following separation of the hydrocarbons from the acid catalyst and the use only of the liquid phase as a coolant in the alkylation reactor. The instant invention provides for passing the hydrocarbon effluent without separation back to cooling elements in the reactor and utilizing the entire effluent, without separating the vapor and liquid phases as a coolant in the reactor and making the separation of vapor from liquid after such use. While it is true that substantially all of the cooling in the reactor is accomplished by the liquid components in both cases, the return of both liquid and vapor makes unnecessary the primary separation, provides greater turbulence and velocity within the heat exchange elements of the reactor to effect a high rate of heat transfer. Cooling by effluent refrigeration as practiced herein is therefore a simplification of that previously disclosed; yet it makes available in the reaction zone just as much isobutane.

An object of the invention therefore is to provide a process wherein the effluent from the alkylation or reaction stage is separated into a hydrocarbon phase and an acid phase, the hydrocarbon phase being passed through a pressure reducing valve where it is chilled by self-evaporative cooling and then passed through cooling elements in the alkylation stage to remove heat from and control the temperature of the reactant mixture.

Another object is to provide a process in which the chilled hydrocarbon effluent after use as a refrigerant in the reaction zone or alkylation stage is passed to a separating stage where the vapors are separated from the liquid and the chilled liquid portion returned and passed in indirect heat exchange with incoming feed to the reactor to reduce its temperature.

A further object is to provide a process in which the vapors evolved from the hydrocarbon effluent during its use as a refrigerant, are separated from the liquid portion, then compressed, condensed and chilled by evaporative cooling prior to being recycled to the reaction step.

Another object is to provide a process constituting a simplification of that disclosed in Patents No. 2,649,486 and No. 2,664,452, said simplification eliminating the vapor liquid separating step following the acid-hydrocarbon separation and prior to recycling the chilled hydrocarbon liquid as a refrigerant to the alkylation or reaction step.

The single figure is a schematic flow diagram of one embodiment of the process. Referring to the drawings at 1 is a reactor shell equipped with an open-ended circulating tube 2. In one end of the circulating tube is a propeller or pump impeller 3 and within the circulating tube is a heat exchanger consisting of a tube bundle 4 provided with a distributing head 5 which encloses one end of the reactor. The impeller is mounted on a shaft 6 rotated through a reduction gear 7 by any suitable prime mover such as an electric motor or steam turbine diagrammatically shown at 8.

Circulation within the reactor is established by the impeller through the annular space between the shell and circulating tube 2 over the cooling tubes 4 and back to the impeller. It will be understood that the flow may be reversed by changing the pitch of the impeller blades and a like result achieved.

To simplify an understanding of the apparatus, it will be described in conjunction with the process employed. Olefinic hydrocarbons and isobutane are introduced to the system through lines 9 and 10, respectively, being combined in feed pipe 11 prior to passage through heat exchanger 12. Recycled isobutane returned through pipe 13 is introduced into the feed in pipe 14. Fresh acid is fed to the reactor through line 15 and recycle acid from settler 16 is returned through pipe 17. The hydrocarbons supplied through lines 9 and 10 mixed with recycled isobutane added through line 13 are mixed in the reactor with the acid catalyst introduced through lines 15, 17 and 18. Alkylation of the isoparaffinic hydrocarbons by the olefinic hydrocarbons takes place in the reactor 1, while the mixture is being rapidly circulated and agitated by the impeller 3 insuring a thorough and intimate mixture of the hydrocarbons with acid catalyst. The mixture of hydrocarbons and acid is discharged from the reactor through pipe 19 passing to the acid settler 16 where it is permitted to separate into an acid phase and a hydrocarbon phase. The acid phase is recycled to the suction side of the pumping impeller 3 of the reactor through line 17, while a portion of the acid separated in the settler may be discarded through the spent acid discharge line 20 to maintain a proper balance and proportioning of catalyst and reactants in the system.

The hydrocarbon phase separated in the settler is discharged from the top of the settler through line 21, and pressure upon these hydrocarbons is reduced at valve 22, after which the liquid vapor mixture is passed immediately through line 23 to the distributing head 5 of the reactor. The head 5 is divided by a partition 5a which causes the coolant to pass through the heat exchange elements or tube bundle 4, thence into the opposite side of the distributing head and out through line 24. Back pressure valve 22 is designed to hold sufficient back pressure on the reactor settler system to prevent vaporization of any of the hydrocarbon components contained therein, for example, when alkylating isobutane with butylenes in a system wherein a small amount of propane is also present the reaction temperature will normally be controlled at 35° F. to 55° F. and the back pressure maintained on the settler by valve 22 will be in the order of 40 p.s.i.g. to 100 p.s.i.g. Upon passing valve 22, pressure on the hydrocarbon phase of the effluent is reduced to the order of 0 ps.i.g. to 10 p.s.i.g. causing a considerable portion of the lighter components of the effluent to vaporize and resulting in the cooling of the entire hydrocarbon effluent mixture. Depending upon the pressure established within the cooling elements or tube bundle 4 of the reactor the temperature of the hydrocarbon effluent phase will be reduced to a figure normally in the range of 15° F. to 30° F. by the reduction of pressure. This chilled effluent which is a mixture of liquid and vapor while passing through the cooling elements 4 of the reactor absorbs the exothermic heat of the alkylation reaction by indirect heat exchange resulting in vaporization of additional lighter components of the effluent.

Upon leaving the cooling elements 4 of the reactor, the chilled and partially vaporized effluent passes from the opposite side of the circulating head through line 24 to suction trap 25 where the vapor and liquid portions of the effluent are separated. A liquid level control 26 manipulating valve 27 regulates the discharge of the liquid phase from the suction trap through pipe 28. This liquid is returned by pump 29 through pipe 30 to heat exchanger 12 where it is brought in heat exchange relation with the incoming feed stock. From the heat exchanger the liquid passes through line 31 to the neutralization and fractionation steps diagrammatically shown at 32.

The vapors separated from the effluent in suction trap 25 pass out through line 33 to compressor 34 from which they are discharged through line 35 to condenser 36 where they are totally condensed. A portion of the condensate from condenser 36 is directed through lines 37 and 38 to isobutane flash drum 39 which is operated at the same pressure as suction trap 25, both pressures being controlled by the suction pressure on compressor 34. Interposed in line 37 is a pressure reducing valve 40 which holds sufficient back pressure on condenser 36 to make possible total condensation of the hydrocarbons at the temperature which can be attained with the available water supply. Liquid hydrocarbons passing through valve 40 are thereby reduced in pressure causing partial vaporization and chilling of the hydrocarbons prior to their introduction into flash drum 39.

When propane is a component of any of the feed streams, a portion of the condensate withdrawn through line 37 is diverted through pipe 41 to the depropanizer of the fractionation section 32. This is necessary in order to purge the system of the same amount of propane as is contained in the feed stocks and after depropanization this stream is returned to the system through line 42, pressure reducing valve 43 and pipes 37 and 38 to the isobutane flash drum 39. Back pressure valve 43 in line 42 functions in the same manner as reducing valve 40 previously described. It will be understood, of course, that if minimum build-up of propane is desired in the reactor system, all of the condensate from condenser 36 may be passed to the depropanizer through line 41 and returned to the system after depropanization through line 42. In such case none of the condensate would pass through pressure reducing valve 40.

The liquid hydrocarbons withdrawn from suction trap 25 and passed to fractionation are there separated into streams of propane, isobutane, normal butane, light alkylate and alkylate bottoms. These product streams are normally removed from the system through pipes 44, 45, 46 and 47, respectively. The isobutane stream taken overhead from deisobutanizer tower is recycled through pipe 48, reduction valve 49 and pipe 38 to the isobutane flash drum from which it is directed to the reaction stage. Fresh isobutane feed to the system may also be brought in either through line 10 or through pipe 50 which connects through line 38 with the isobutane flash drum. All of the streams entering the isobutane drum 39 are subjected to reduced pressure established by the suction of the compressor and are thereby self-refrigerated. The vapors evolved in the isobutane flash drum by this self-refrigeration are passed through line 51 to the compressor, while the chilled liquid from the drum, principally isobutane, is directed through line 52 to pump 53 and thence through lines 13 and 14 to the reactor.

Any type reactor system may be used in the process, for example the reactor shown which contains an integral pump, a circulating tube and heat exchanger may be replaced by a reactor system comprising a reaction vessel, an external circulating pump, heat exchanger in which the chilled effluent is used as a refrigerant and interconnected piping. Circulation in such apparatus would be established from the reaction tank through the circulating pump, thence through heat exchange or chiller and back to the reaction tank.

From the foregoing it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. In a process of effluent refrigeration as applied to the alkylation of paraffinic hydrocarbons by olefinic hydrocarbons wherein the reaction is maintained under sufficient pressure to maintain the reactants in liquid phase, a mixture of hydrocarbons and catalyst is withdrawn from the reaction step, the catalyst is separated from the hydrocarbon phase in a first separating step and pressure is reduced on the hydrocarbon phase to refrigerate it and vaporize excess volatile hydrocarbons, the alkylate being nonevaporable under the pressures and temperatures existing in the system, the improvement which comprises directly passing the refrigerated hydrocarbon phase, including both liquid and vapor without separation, in indirect heat exchange with the mixture of hydrocarbons and catalyst in the reaction step to lower the temperature of the materials undergoing reaction and vaporize further volatile hydrocarbons, then separating the liquid portion of the chilled hydrocarbon phase from the vapor portion thereof in a second separating step, and removing both liquid and vapor phase material separately from said second separating step.

2. A process as in claim 1 including the step of utilizing the liquid phase material removed from said second separating step as a coolant for feed stock charged to the reaction step.

3. A process as in claim 1 including the steps of condensing the vapor phase material removed from said second separating step and recycling it as a portion of the feed to the reaction step.

4. A process as in claim 1 including the steps of passing the liquid phase material separated from said second separating step as a coolant for feed stock charged to the reaction step and condensing the vapor phase material removed from said second separating step and recycling is as a portion of the feed to the reaction step.

5. A process as in claim 1 including the steps of condensing the vapor phase material removed from said second separating step and passing it to a self-evaporative refrigeration step maintained at reduced pressure from which the refrigerated material is recycled as part of the feed to the reaction step.

6. In a process for catalytic isoparaffin-olefin alkylation wherein the reaction is maintained under sufficient pressure to maintain the reactants in liquid phase, and wherein an effluent reaction mixture is separated into a liquid hydrocarbon phase and a catalyst phase, the improvement which comprises: subjecting a stream of said hydrocarbon phase to a substantial reduction in pressure, whereby abrupt vaporization and expansion of the resulting vapors are caused; and passing the commingled liquid and vapor phases from said pressure reduction step, under the accelerating force of said expansion, in indirect heat exchange with the reaction mixture.

7. In a process for catalytic isoparaffin-olefin alkylation wherein the reaction is maintained under sufficient pressure to maintain the reactants in liquid phase, and wherein an effluent reaction mixture is separated into a liquid hydrocarbon phase and a catalyst phase, the improvement which comprises: subjecting a stream of said hydrocarbon phase to a substantial reduction in pressure, whereby vaporization and expansion of the resulting vapors are caused; and passing the commingled liquid and vapor phases from said pressure reduction step in indirect heat exchange with the reaction mixture.

References Cited in the file of this patent
UNITED STATES PATENTS

| | | |
|---|---|---|
| 2,123,021 | Phillips | July 5, 1938 |
| 2,441,249 | Ocon et al. | May 11, 1948 |
| 2,664,452 | Putney | Dec. 29, 1953 |